United States Patent
Chen

(10) Patent No.: US 7,699,953 B2
(45) Date of Patent: Apr. 20, 2010

(54) METHOD FOR ENVELOPING SILICONE GEL WITH PLASTIC FILMS AND PRODUCT THEREOF

(76) Inventor: Hui-Mei Chen, No. 52, Beinei St., Shulin City, Taipei County 238 (TW)

( * ) Notice: Subject to any disclaimer, the term of this patent is extended or adjusted under 35 U.S.C. 154(b) by 429 days.

(21) Appl. No.: 11/468,294

(22) Filed: Aug. 29, 2006

(65) Prior Publication Data

US 2008/0057241 A1    Mar. 6, 2008

(51) Int. Cl.
    *B32B 37/00* (2006.01)
(52) U.S. Cl. .................. 156/145; 156/221; 156/242; 156/245; 156/285; 156/286
(58) Field of Classification Search ............. 156/272.2, 156/221, 145, 242, 245, 285, 286
    See application file for complete search history.

(56) References Cited

U.S. PATENT DOCUMENTS

| | | | | |
|---|---|---|---|---|
| 3,554,828 A | * | 1/1971 | Schmedding et al | 156/156 |
| 5,133,823 A | * | 7/1992 | Nicolaisen et al. | 156/314 |
| 5,487,950 A | * | 1/1996 | Weber et al. | 428/484.1 |
| 6,623,588 B1 | * | 9/2003 | Rasmussen | 156/221 |
| 2002/0193885 A1 | * | 12/2002 | Legeay et al. | 623/23.72 |

FOREIGN PATENT DOCUMENTS

| EP | 0057033 B1 | * | 11/1984 |
|---|---|---|---|
| GB | 2257387 A | * | 1/1993 |

* cited by examiner

*Primary Examiner*—Jeff H Aftergut
(74) *Attorney, Agent, or Firm*—Chun-Ming Shih

(57) ABSTRACT

A method and a product of one-time enveloping silicone gel with plastic films. The surfaces of two films to be in contact with the silicone gel are treated by a plasma casing process (crosslinking by activated species of inert gases) or an electron beam process in advance so as to improve the wetting capability thereof. Thereby the films and the silicone gel are able to tightly combine together without the fear of separation. The operation is carried out under a vacuum environment so that no bubble will be generated therein and the leakage of the silicone gel on welding portions will be prevented.

4 Claims, 8 Drawing Sheets

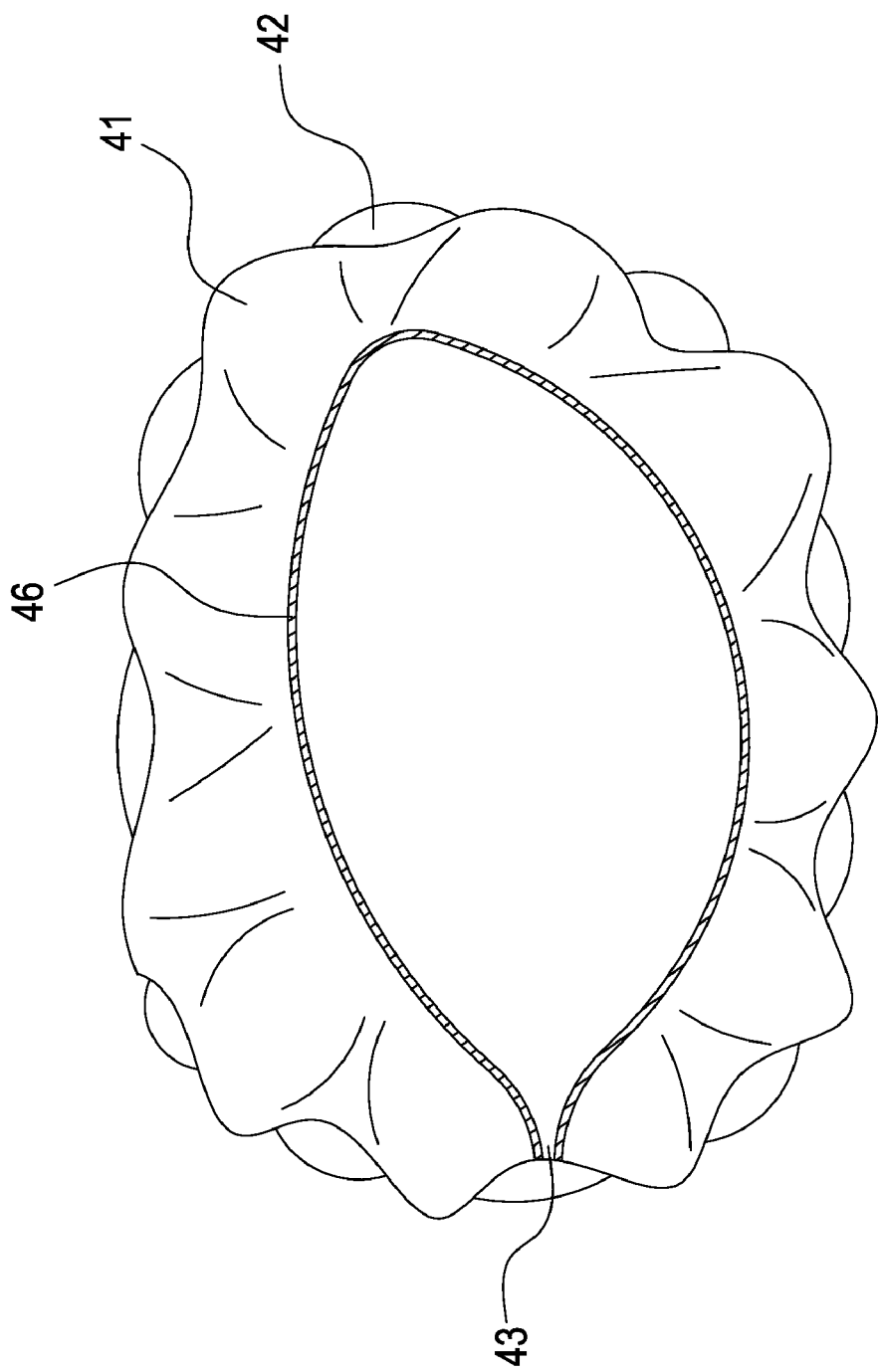

METHOD FOR ENVELOPING SILICONE GEL WITH PLASTIC FILMS AND PRODUCT THEREOF

BACKGROUND OF THE INVENTION

1. Field of the Invention

The present invention relates to a method and a product of enveloping silicone gel with plastic films, and in particular to a method for enveloping silicone gel under a vacuum environment with a first and a second plastic films which have been treated by a surface implement process, such as a plasma casing process or an electron beam process and a product thereof.

2. Description of the Prior Art

Referring to schematic views in FIGS. 1A through 1D, a conventional method for enveloping silicone gel with plastic films is normally performed in an atmospheric environment, which includes the following steps.

Step 1: Provide two plastic films 41, 42 by a film forming machine.

Step 2: Combine two plastic films 41, 42 into a bag like enclosure 46 with an opening 43 by a film welding machine to (see FIG. 1A).

Step 3: Pour silicone gel 2 into the enclosure 46 from the opening 43 to fill the silicone gel 2 with air 45. In order to enhance adhesion between the silicone gel 2 and the films 41, 42, an adhesive is added in the silicone gel 2, or spread on the contact surfaces of the two films 41, 42 (see FIG. 1B).

Step 4: Continuously expel bubbles 44 and the air 45 out of the enclosure 46 through the opening 43 by manually squeezing the enclosure 46 with the silicon gel 2.

Step 5: Close the opening 43 by the film welding machine after the bubbles 44 and the air 45 are totally expelled from the enclosure 46 so as to complete the operation of enveloping the silicone gel 2 with the plastic films 41 and 42 (see FIGS. 1C and 1D).

However, the above-mentioned conventional method has several drawbacks, namely:

1. It needs to perform two-stage welding procedures, and the leakage of silicon gel will happen on bad welding portions.

2. It is time and labor consuming to apply adhesion between the silicon gel and the films 41, 42. Moreover, the adhesion will damage the silicone gel to degrade the quality of the product.

3. Since the enveloping of silicone gel 2 is performed in the atmospheric environment, which leads the problem of the bubbles 44 and the air 45 existed in the enclosure 46 when filling in the silicone gel 2, a lousy work has to follow for expelling the bubbles 44 and the air 45. Such procedure further brings the following extra shortcomings:

(1) Wasting too much manpower and time,
   (2) A poor yield of product,
   (3) Difficult to isolate bacterial contamination,
   (4) Incompletely cleaning of the bubbles and the air causing separation of the silicone gel from the contact surfaces of the films under an abnormal circumstance, such as during air transportation,
   (5) Degrading the stability, quality and yield of the product due to the manual fabrication process.

For these defects inevitably brought on the prior art, an improvement is seriously required.

The applicant has plunged into this matter for years to studying and improving these defects and come up with a novel method and product of enveloping silicone gel with plastic films as provided in this invention to eliminate the defects mentioned above.

These features and advantages of the present invention will be fully understood and appreciated from the following detailed description of the accompanying Drawings.

SUMMARY OF THE INVENTION

The present invention is to provide a method and a product of enveloping silicone gel with plastic films in which the contact surfaces of plastic films with the silicone gel are treated in advance by a plasma casing process or an electron beam process in order to improve the wetting capability thereof, thereby the plastic films and the silicone gel are able to tightly combine together without the fear of separation.

The present invention is to perform a method and a product of one-time enveloping silicone gel with plastic films under a vacuum environment so that no bubble or air will be generated therein and the leakage of the silicone gel on welding portions will be prevented.

The present invention introduces an automatic process to upgrade product yield and quality by getting rid of manual factors, and also to save the labor thus reduce the fabrication cost.

Accordingly, the method of the present invention comprises the steps as follows.

Step 1: Provide a first plastic and a second plastic film by a film forming machine. Each of the two films has a surface to be in contact with a silicone gel.

Step 2: Perform a plasma casing process to the surfaces of the first and the second plastic films by a plasma casing machine under a low temperature and low pressure to improve the surface wetting capability thereof. Alternatively, the surfaces of the first and the second plastic films can be treated by an electron beam process to improve the surface wetting capability.

Step 3: Locate the two plastic films in a vacuum chamber and holding the first film at a lower position with its contact surface facing upwards to contact with the silicone gel. On the other hand, the second plastic film is set above the first plastic film and with its contact surface facing downwards to contact with the silicone gel. Such that the two contact surfaces of the two plastic films are facing to each other. Then apply the silicone gel on the contact surface of the first plastic film, and cover the contact surface of the second plastic film on the first plastic film and the silicone gel to weld the contact edges of the two films by a film welding machine. As such, the silicone gel is enveloped within the two plastic films under a vacuum environment without any bubbles and air occurred.

Thus the procedures of enveloping the silicone gel with two plastic films are completed and the product of the present invention is obtained.

DETAILED DESCRIPTION OF THE PREFERRED EMBODIMENT

Figure 1:
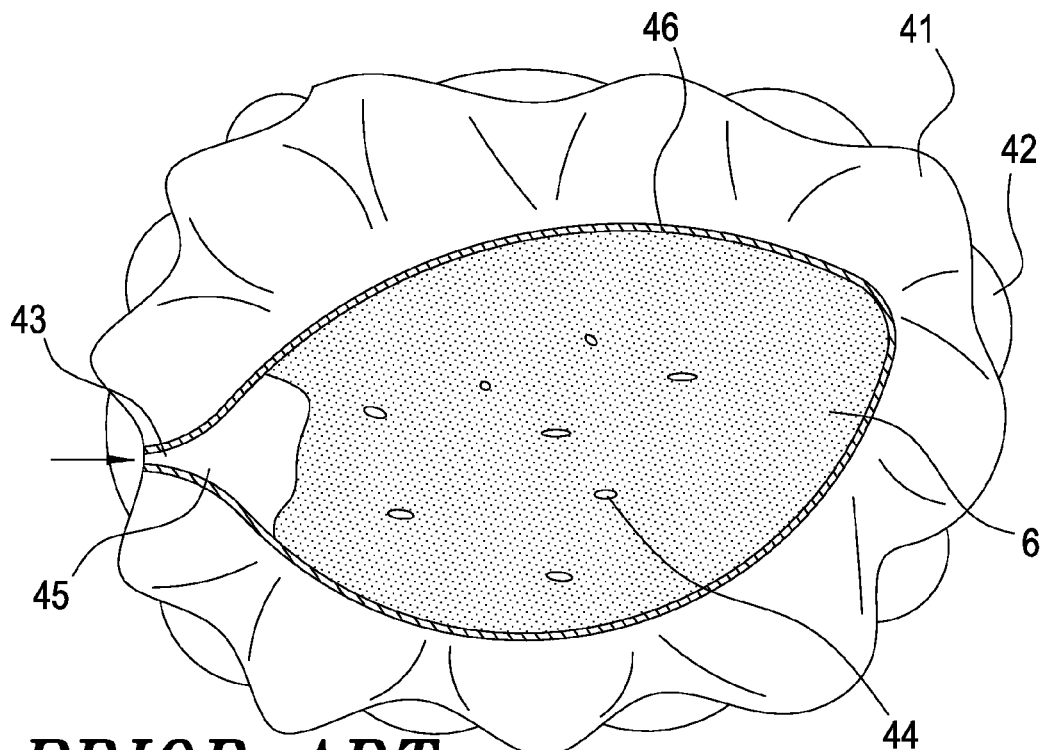
FIGS. 1A through 1D are schematic views showing a conventional method for enveloping the silicone gel with plastic films.
Figure 1:
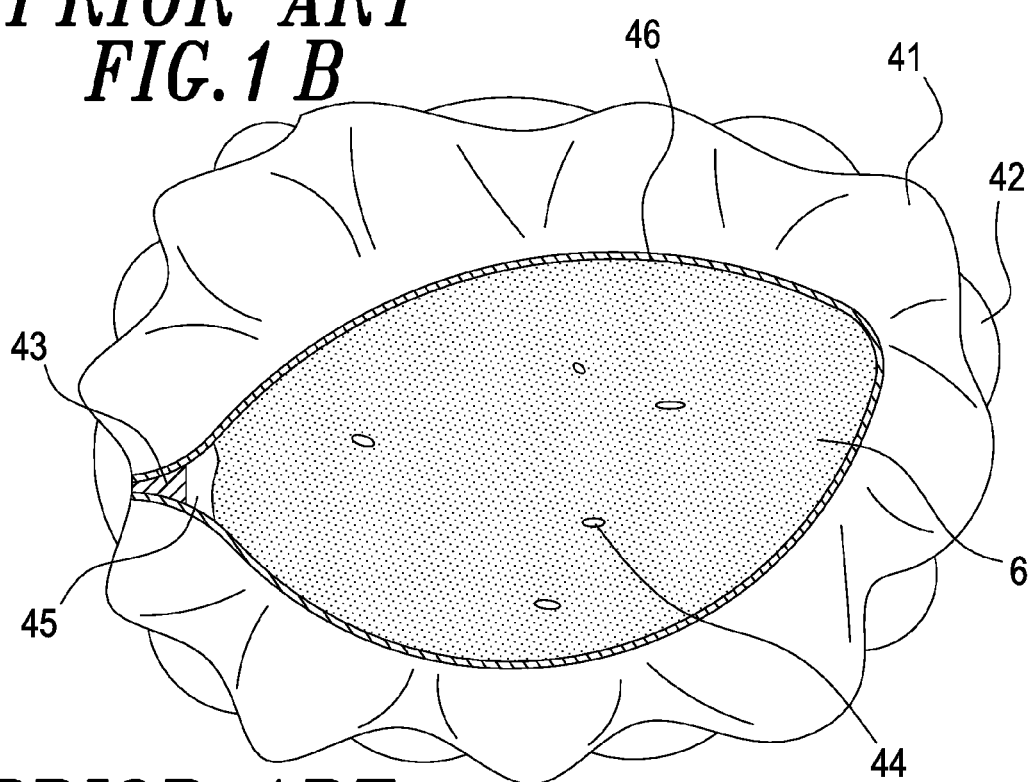
Figure 1D:
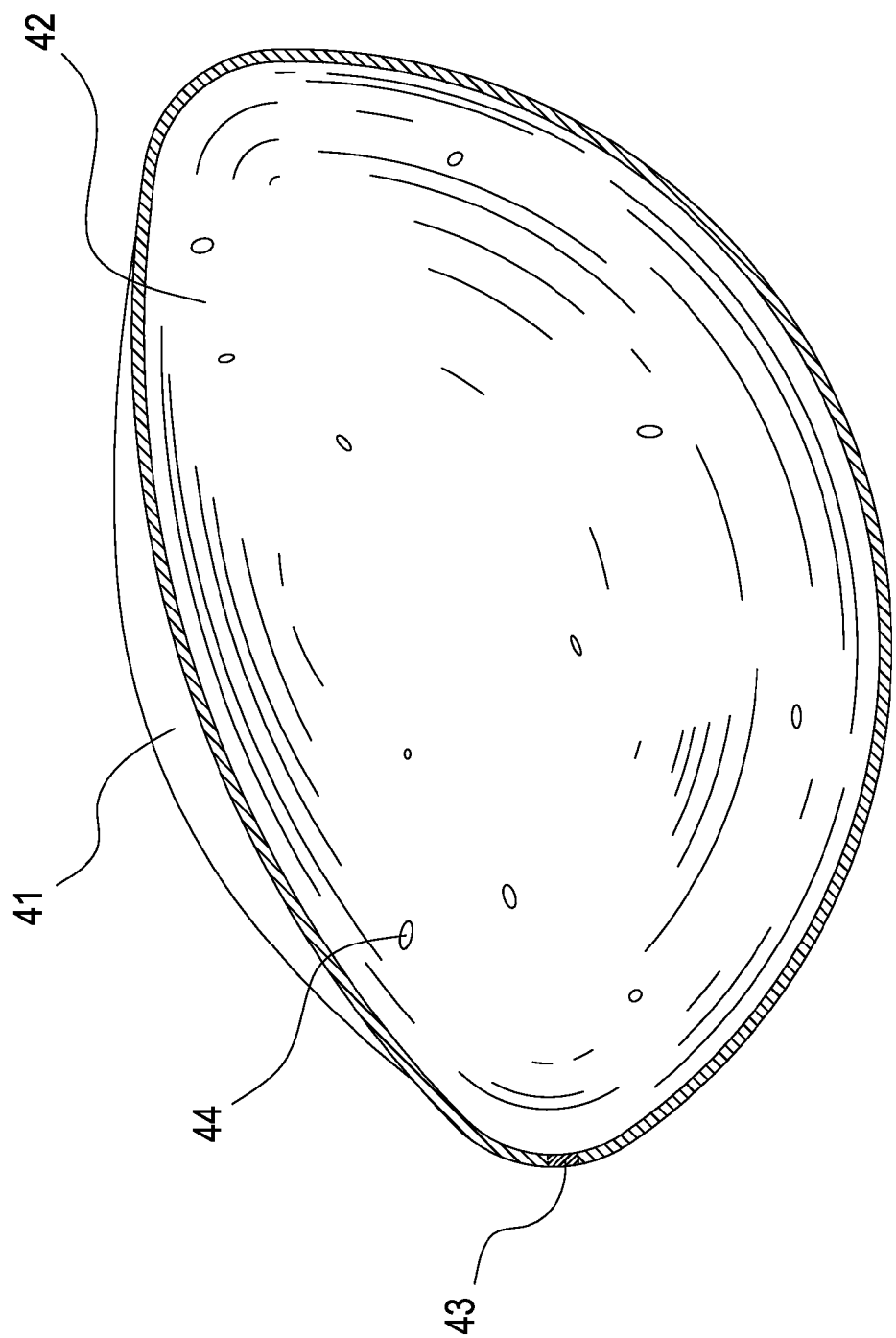
Figure 2A:
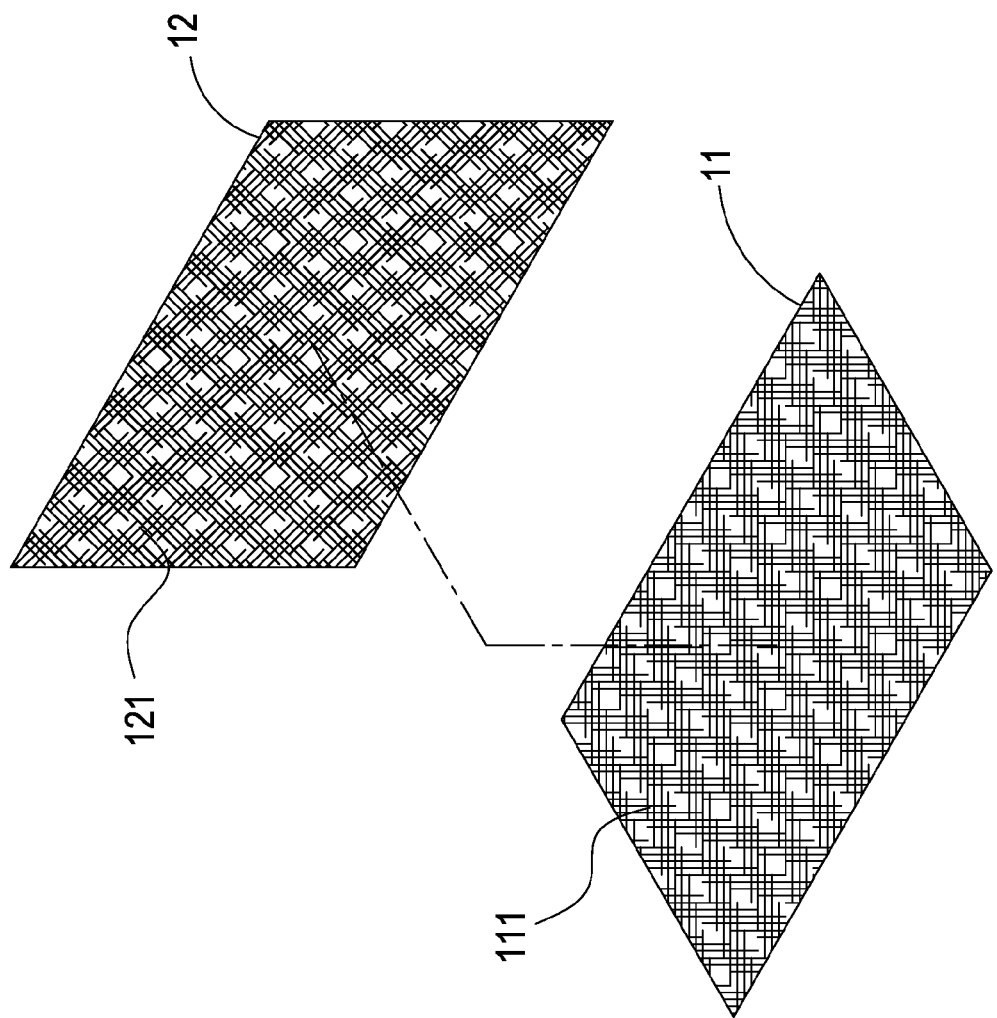
FIGS. 2A through 2D are schematic views illustrating a method for enveloping the silicone gel with two plastic films utilizing surface implement process according to the present invention.
Figure 2B:
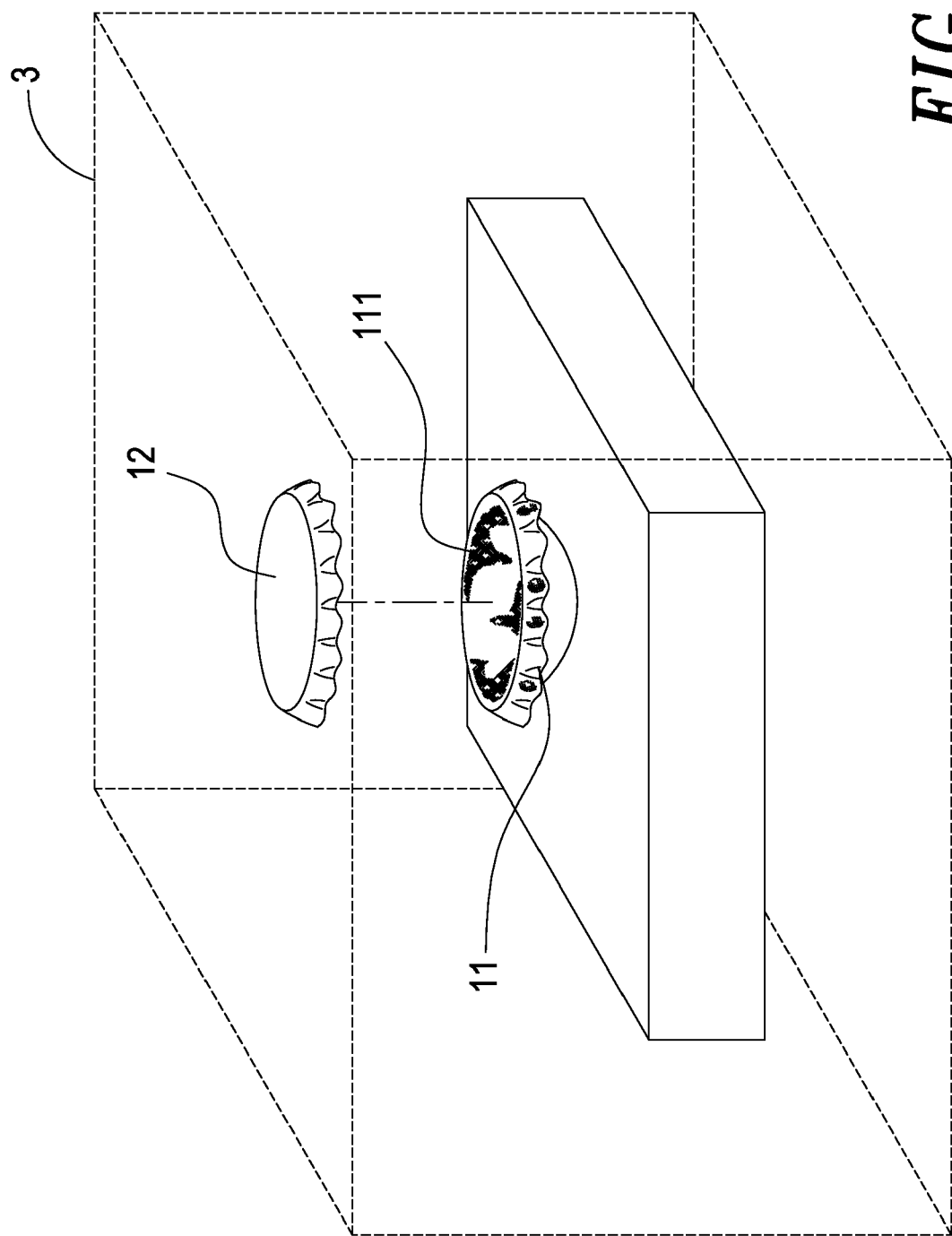
Figure 2C:
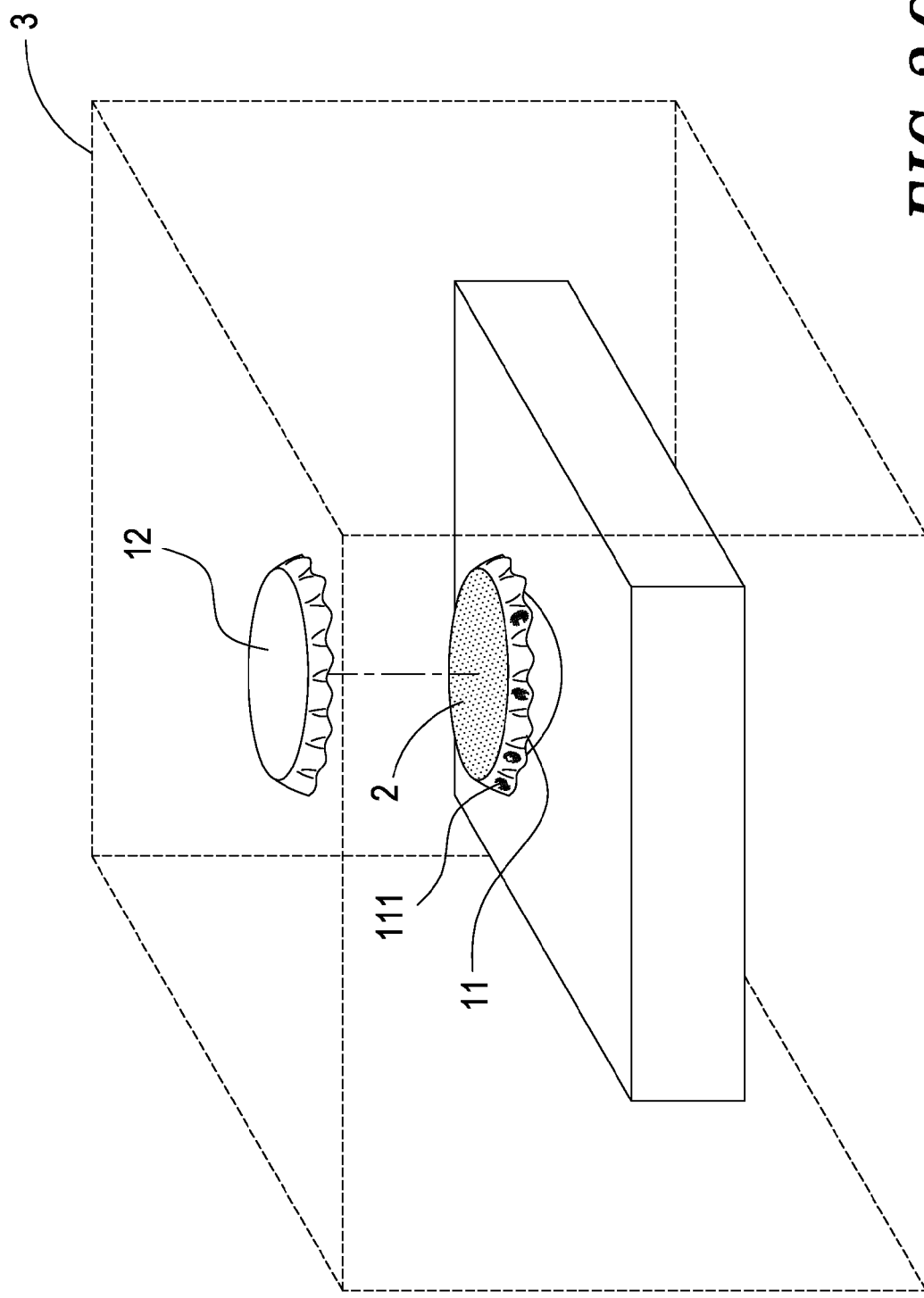
Figure 2D:
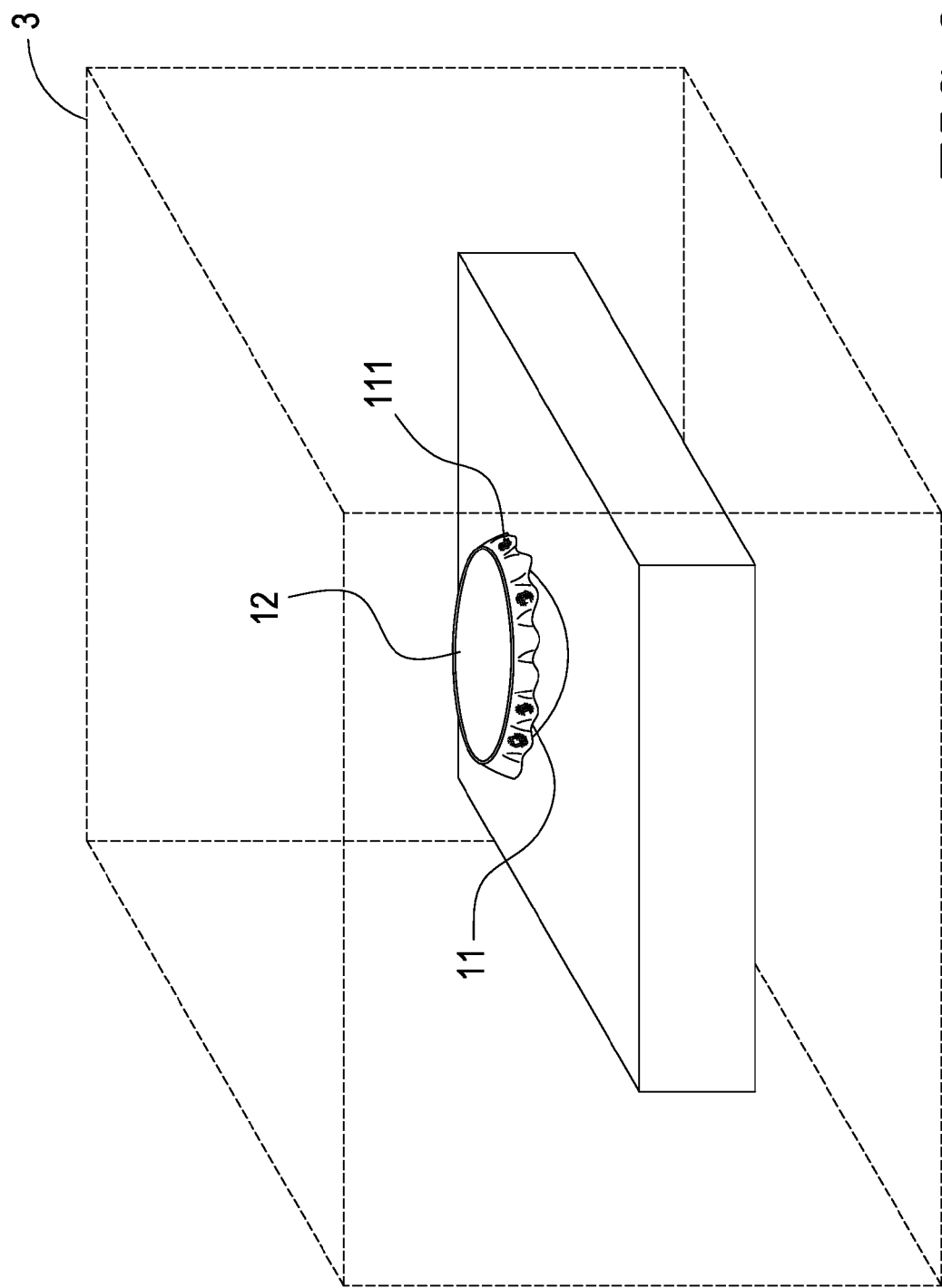
Figure 3:
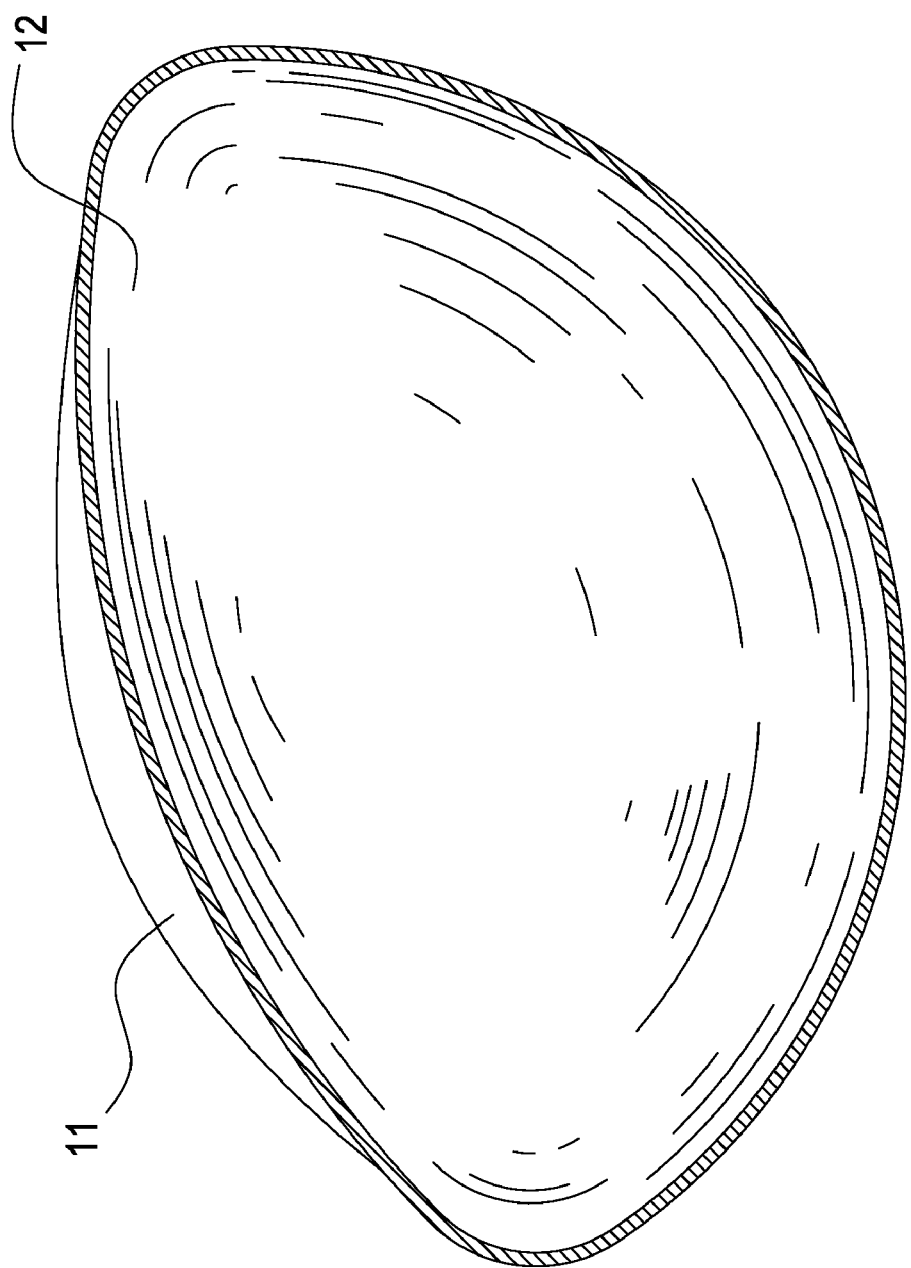
FIG. 3 is a perspective view of a product making from the method of the present invention.

Referring to FIGS. 2A through 2D and FIG. 3, a method and a product of enveloping the silicone gel with plastic films of the present invention comprises the steps as follows.

Step 1: Provide a first plastic film 11 and a second plastic film 12 by a film forming machine. Each of the two plastic films 11 and 12 has one surface 111 and 112 to be in contact with the silicone gel 2.

Step 2: Perform a plasma casing (crosslinking by activated species of inert gases) process to the surfaces 111, 112 of the two plastic films 11, 12 by a plasma casing machine under a low temperature and low pressure to improve the surface wetting capability thereof so that the two surfaces 111 and 121 are able to tightly contact with the silicone gel 2 (see FIG. 2A). Alternatively, the surfaces 111 and 121 of the first and the second plastic films 11 and 12 can be treated by an electron beam process to obtain enhanced surface wetting capability.

Step 3: Locate the two plastic films 11 and 12 in a vacuum chamber 3 and holding the first plastic film 11 with its surface 111 facing upwards to contact with the silicone gel 2. On the other hand, the second plastic film 12 is set on top of the first plastic film 11 with its surface 121 facing downwards to contact with the silicone gel 2. Such that, the two surfaces 111, 112 are facing to each other (see FIG. 2B). Then apply the silicone gel 2 on the surface 111 of the fist plastic film 11 (see FIG. 2C), and cover the surface 121 of the second plastic film 12 on the surface 111 of the first plastic film 11 and the silicone gel 2 to seal the contact edges of the two plastic films 11 and 12 by a film sealing machine. As such, the silicone gel 2 is enveloped between the two plastic films 11 and 12 under a vacuum environment without any bubbles and air in the silicone gel 2 and leak between two plastic films 11 and 12 (see FIG. 2D).

Preferably the plastic film 11 or 12 includes polyurethane (TPU) film or other kinds of plastic material film.

Thus complete the procedures of enveloping the silicone gel 2 with two plastic films 11 and 12 and obtaining the product (see FIG. 3) of the present invention.

The method for enveloping silicone gel with plastic films of the present invention has several advantages compared to conventional one, namely:

1. The surfaces in contact with the silicone gel of the two plastic films are treated by a plasma casing process or an electron beam process to improve the wetting capability of the contact surfaces, which enhances the contact effect of the silicone gel with the films.

2. Using the plasma casing process or the electron beam process provides clean, dust free, stable, time and labor saving benefits in manufacturing. Moreover, since only physical treatment is performed, the product has a stable quality without the fear of separation of silicone gel from the films (because no variance involved in the process).

3. The enveloping is performed by automatic operation in the vacuum environment so as to assure clean, dust free, non-bacterial contaminated, stable and high quality product obtained by less manpower and working time, and result in material saving and cost reducing.

4. The silicone gel 2 is one-time enveloped between the two plastic films under a vacuum environment so that no bubble or air will be generated in the silicon gel and the leakage of the silicone gel on welding portions of tow plastic films will be prevented.

5. The wetting capability of the contact surfaces of the films with the silicone gel is improved by the plasma casing process or the electron beam process so that there is no concern of separation of the silicone gel from the films even under the worst environmental condition such as during the air transportation.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method for enveloping silicone gel with plastic films, comprising the steps in sequence of:
    a) providing a first plastic film with a first surface and a second plastic film with a second surface;
    b) performing a surface implement process to the first surface and the second surface to improve surface wetting capability of the first surface and the second surface; and
    c) locating the first plastic film and the second plastic film separately in a vacuum chamber, holding the first plastic film with the first surface facing upwards to receive silicone gel and setting the second plastic film on top of the first plastic film with the second surface facing downwards to cover the first plastic film, and applying the silicone gel then cover the second plastic film on the silicon gel and edge of the first plastic film, and sealing contact edges of the first plastic film and the second plastic film, so as to tightly envelope the silicone gel between the first plastic film and the second plastic film without generating any bubble and air and leak in the vacuum chamber.

2. The method of claim 1, wherein the surface implement process is a plasma-casing process or an electron beam process.

3. The method of claim 1, wherein each of the first plastic film and the second plastic film comprises polyurethane.

4. The method of claim 1, wherein the contact edges of the first plastic film and the second plastic film are sealed by a film sealing machine.

* * * * *